United States Patent
Kasai

(10) Patent No.: US 9,477,377 B2
(45) Date of Patent: Oct. 25, 2016

(54) OPERATION DEVICE, IMAGE FORMING APPARATUS AND IMAGE FORMING APPARATUS SYSTEM

(71) Applicant: KYOCERA Document Solutions Inc., Osaka-shi, Osaka (JP)

(72) Inventor: Rie Kasai, Osaka (JP)

(73) Assignee: KYOCERA DOCUMENT SOLUTIONS INC., Osaka-shi (JP)

( * ) Notice: Subject to any disclaimer, the term of this patent is extended or adjusted under 35 U.S.C. 154(b) by 714 days.

(21) Appl. No.: 13/747,809

(22) Filed: Jan. 23, 2013

(65) Prior Publication Data

US 2013/0198671 A1   Aug. 1, 2013

(30) Foreign Application Priority Data

Jan. 26, 2012 (JP) .................................. 2012-014006
Jan. 15, 2013 (JP) .................................. 2013-004296

(51) Int. Cl.
*G06F 3/048* (2013.01)
*G06F 3/0482* (2013.01)
(Continued)

(52) U.S. Cl.
CPC ........... *G06F 3/0482* (2013.01); *G06F 9/4446* (2013.01); *H04N 1/0035* (2013.01); *H04N 1/00347* (2013.01); *H04N 1/00384* (2013.01); *H04N 1/00411* (2013.01);
(Continued)

(58) Field of Classification Search
CPC .. G06F 3/0482; G06F 9/4446; G06F 21/608; H04N 1/00347; H04N 1/0035; H04N 1/00384; H04N 1/00411; H04N 1/00416; H04N 1/00427; H04N 1/00474; H04N 1/00482; H04N 2201/0094; H04N 1/00437; G06K 15/00; G06K 15/021; G06K 1/121
USPC ........................................... 715/771; 345/156
See application file for complete search history.

(56) References Cited

U.S. PATENT DOCUMENTS 5,496,117 A * 3/1996 Sawada ...................... B41J 3/01
  400/103
6,446,068 B1   9/2002 Kortge
(Continued)

FOREIGN PATENT DOCUMENTS

| JP | 2007-25976 | 2/2007 |
| JP | 2009-122184 | 6/2009 |
| JP | 201151163 A | 3/2011 |

OTHER PUBLICATIONS

European Office Action Dated Jul. 7, 2016.

*Primary Examiner* — Jeffrey A Gaffin
*Assistant Examiner* — Justin Lee
(74) *Attorney, Agent, or Firm* — Gerald E. Hespos; Michael J. Porco; Matthew T. Hespos

(57) ABSTRACT

An operation device includes a display unit, an operation unit, a registration unit, a searching unit and a guide screen generator unit. When a registration command is input for a screen displayed on the display unit, specific information of that screen is registered in the registration unit. The operation unit is operated to select a screen, for which a command to display an access procedure is input, out of a list screen relating to information of registered screens. This causes the searching unit to search a route to access that screen from a higher ranked screen. The guide screen generator unit generates a guide screen showing an access procedure utilizing that route and causes the display unit to display the generated guide screen.

7 Claims, 17 Drawing Sheets

(51) Int. Cl.
　　　*H04N 1/00*　　　(2006.01)
　　　*G06F 9/44*　　　(2006.01)
(52) U.S. Cl.
　　　CPC ..... *H04N 1/00416* (2013.01); *H04N 1/00424* (2013.01); *H04N 1/00427* (2013.01); *H04N 1/00474* (2013.01); *H04N 1/00482* (2013.01); *H04N 1/00973* (2013.01)

(56) References Cited

U.S. PATENT DOCUMENTS

| | | | |
|---|---|---|---|
| 6,462,762 B1 | 10/2002 | Ku et al. | |
| 7,447,457 B2 * | 11/2008 | Tose | G03G 15/5016 399/81 |
| 8,176,075 B2 * | 5/2012 | Kuroyanagi | G06F 21/608 707/694 |
| 8,534,828 B2 * | 9/2013 | Ito | B41J 3/01 347/107 |
| 2001/0045965 A1 | 11/2001 | Orbanes et al. | |
| 2001/0048774 A1 * | 12/2001 | Seki | H04N 1/00132 382/305 |
| 2002/0065090 A1 * | 5/2002 | Ohba | H04B 7/18582 455/503 |
| 2005/0165497 A1 * | 7/2005 | Tanabe | H04M 1/72583 700/23 |
| 2006/0212829 A1 * | 9/2006 | Yahiro | G06F 3/0482 715/810 |
| 2007/0079284 A1 * | 4/2007 | Kim | G06F 17/30572 717/113 |
| 2008/0034322 A1 * | 2/2008 | Kujirai | G06F 3/04845 715/808 |
| 2008/0038032 A1 * | 2/2008 | Suzue | H04N 1/0035 400/62 |
| 2008/0141167 A1 * | 6/2008 | Kubo | G06F 3/0482 715/796 |
| 2010/0208300 A1 | 8/2010 | Kamasuka | |
| 2010/0281360 A1 * | 11/2010 | Arakane | G06F 3/0482 715/244 |
| 2012/0268771 A1 * | 10/2012 | Kruizinga | H04N 1/00029 358/1.14 |

* cited by examiner

FIG. 5

| SCREEN SPECIFIC INFORMATION | SCREEN IMAGE DATA PATH | PREVIOUS SCREEN TRIGGER COORDINATES | CHARACTER DATA |
|---|---|---|---|
| Root_0001 | Root_0001.jpg | - | ROUTE |
| DISPLAY_01000 | Path_H01000.jpg | (50,50)-(100,100) | SCAN SETTING |
| DISPLAY_02000 | Path_H02000.jpg | (50,50)-(100,100) | SYSTEM SETTING |
| DISPLAY_01100 | Path_H01100.jpg | (10,20)-(80,50) | SCAN DOCUMENT SIZE SETTING |
| OPERATION_01000 | Path_E01000.jpg | (100,100)-(200,150) | SCAN |
| DISPLAY_02110 | Path_H02110.jpg | (20,50)-(150,100) | SYSTEM BASIC SETTING |
| DISPLAY_02120 | Path_H02120.jpg | (20,120)-(150,170) | DATE SETTING |
| SETTING_01110 | Path_S01110.jpg | (20,20)-(80,50) | SCANNING OF A3 DOCUMENTS |
| SETTING_01120 | Path_S01120.jpg | (100,20)-(150,50) | SCANNING OF A4 DOCUMENTS |
| SETTING_01130 | Path_S01130.jpg | (180,20)-(230,50) | SCANNING OF A5 DOCUMENTS |
| DISPLAY ITEM_02111 | Path_K02111.jpg | (20,120)-(150,170) | AUTHENTICATION MODE |
| DISPLAY ITEM_02112 | Path_K02111.jpg | (100,200)-(150,210) | DISPLAY LANGUAGE |

FIG. 10

DISPLAY SYSTEM BASIC SETTING

403

MENU (30a) > SYSTEM SCREEN (32) > SYSTEM SETTING (12a)

SYSTEM SETTING:
- BASIC SETTING
- USER SETTING
- ···SETTING
- DATE SETTING
- ···SETTING
- NETWORK SETTING

> 15a

BASIC SETTING:
- AUTHENTICATION MODE: XXXX    XXXXX:XXXX
- DISPLAY LANGUAGE: JAPANESE   YYYYY:XXXX

[RETURN]

34

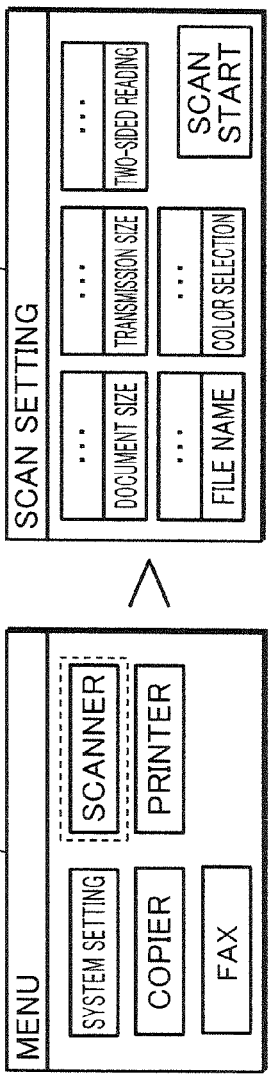

OPERATION DEVICE, IMAGE FORMING APPARATUS AND IMAGE FORMING APPARATUS SYSTEM

This application is based on Japanese Patent Application Serial No. 2012-014006 filed with the Japan Patent Office on Jan. 26, 2012 and Japanese Patent Application Serial No. 2013-4296 filed with the Japan Patent Office on Jan. 15, 2013, the contents of which are hereby incorporated by reference.

BACKGROUND

The present disclosure relates to a function of displaying an operation procedure, for example, utilizing screens displayed on a display unit provided on an image forming apparatus.

Some of image forming apparatuses display an operation procedure using screens displayed on a display unit. For example, an image forming apparatus has been proposed which can record the numbers of a series of maintenance screens displayed on a display unit at the time of maintenance in an external storage medium and reproduce a maintenance procedure on the display unit. According to this, maintenance can be performed in the same procedure as the maintenance recorded in the storage medium, wherefore even a person other than a service person can easily perform the maintenance.

An image forming apparatus has been also proposed which records a subsequent series of operation procedures in the form of an ID sequence of an operated key in an HDD of the image forming apparatus, for example, when a moving image registration button is depressed, whereby moving images of the series of operation procedures can be reproduced.

In the operation of the image forming apparatus, screens displayed on the display unit have a hierarchical structure with an initial screen at the top. Thus, how to access screens which are not normally used and located at the bottom of a hierarchy may not be known. For such a screen, it is convenient if an operation procedure of accessing that screen can be displayed on the display unit by being registered. In this case, a method for displaying the screen if the registered screen is selected like a so-called "favorite" is conceivable. However, if a targeted screen can be accessed by repeating the input of a set value (e.g. numerical value) to the screen and the switch of the screen according to a specific situation, it is difficult to apply the "favorite" method.

As described above, it is convenient if an operation procedure of accessing a registered screen can be displayed on a display unit. However, it is a burden on a user to request an operation of accessing a targeted screen from a higher ranked screen when the user registers a screen displayed on the display unit. Particularly, if how to access a screen is forgotten, that screen cannot be registered.

The present disclosure aims to provide an operation device capable of registering screens by an easy operation and displaying a procedure of successively accessing the registered screens from upper ranked ones, and an image forming apparatus and an image forming apparatus system provided with the same.

SUMMARY

An operation device according to one aspect of the present disclosure is an operation device used for the operation of a first apparatus and includes a display unit, an operation unit, an image data storage unit, a display controller unit, a data structure storage unit, a character data storage unit, a registration unit, a list screen generator unit, a searching unit and a guide screen generator unit. The operation unit receives various inputs from a user. The image data storage unit stores a plurality of image data respectively representing a plurality of screens used for the operation of the first apparatus in advance. The display controller unit selects one image data out of the plurality of image data stored in the image data storage unit in accordance with the operation of the operation unit and causes the display unit to display the screen represented by the selected image data. The data structure storage unit stores a tree-structured data structure corresponding to a hierarchical structure of screens to be displayed on the display unit, the data structure being constituted by specific information for specifying each of the plurality of screens, in advance. The character data storage unit stores character data representing the content of each of the plurality of screens in correspondence with the specific information of each of the plurality of screens in advance. The registration unit registers the specific information of a screen, for which a registration command has been input, when the operation unit is operated to input the registration command for the screen displayed on the display unit. The list screen generator unit generates a list screen utilizing the character data corresponding to the specific information coinciding with the specific information registered in the registration unit out of the character data stored in the character data storage unit and causes the display unit to display the generated list screen when a command to display a list screen relating to the screen for which the registration command has been input is input by operating the operation unit. The searching unit searches a route for accessing from a higher ranked screen for a screen, for which a command to display an access procedure has been input out of the list screen by operating the operation unit, utilizing the data structure stored in the data structure storage unit. The guide screen generator unit generates a guide screen showing a procedure capable of accessing the screen, for which the command to display the access procedure has been input, utilizing a screen specified by the specific information included in the route searched by the searching unit and causes the display unit to display the generated guide screen.

An image forming apparatus according to another aspect of the present disclosure includes the operation device and functions as the first apparatus.

An image forming apparatus according to still another aspect of the present disclosure includes an image forming apparatus and another image forming apparatus. The image forming apparatus includes the operation device and functions as the first apparatus. The other image forming apparatus includes the operation device and functions as the second apparatus.

These and other objects, features and advantages of the present disclosure will become more apparent upon reading the following detailed description along with the accompanying drawings.

BRIEF DESCRIPTION OF THE DRAWINGS

FIG. 5 is a diagram showing a specific example of a table containing character data representing the contents of the screens shown in FIG. 3, FIG. 10 is a diagram showing a specific example of a guide screen generated in a guide screen generator unit in the modification of the first embodiment, FIG. 19 is a diagram showing a specific example of a guide screen generated in a guide screen generator unit in the second embodiment.

DETAILED DESCRIPTION

Figure 1:
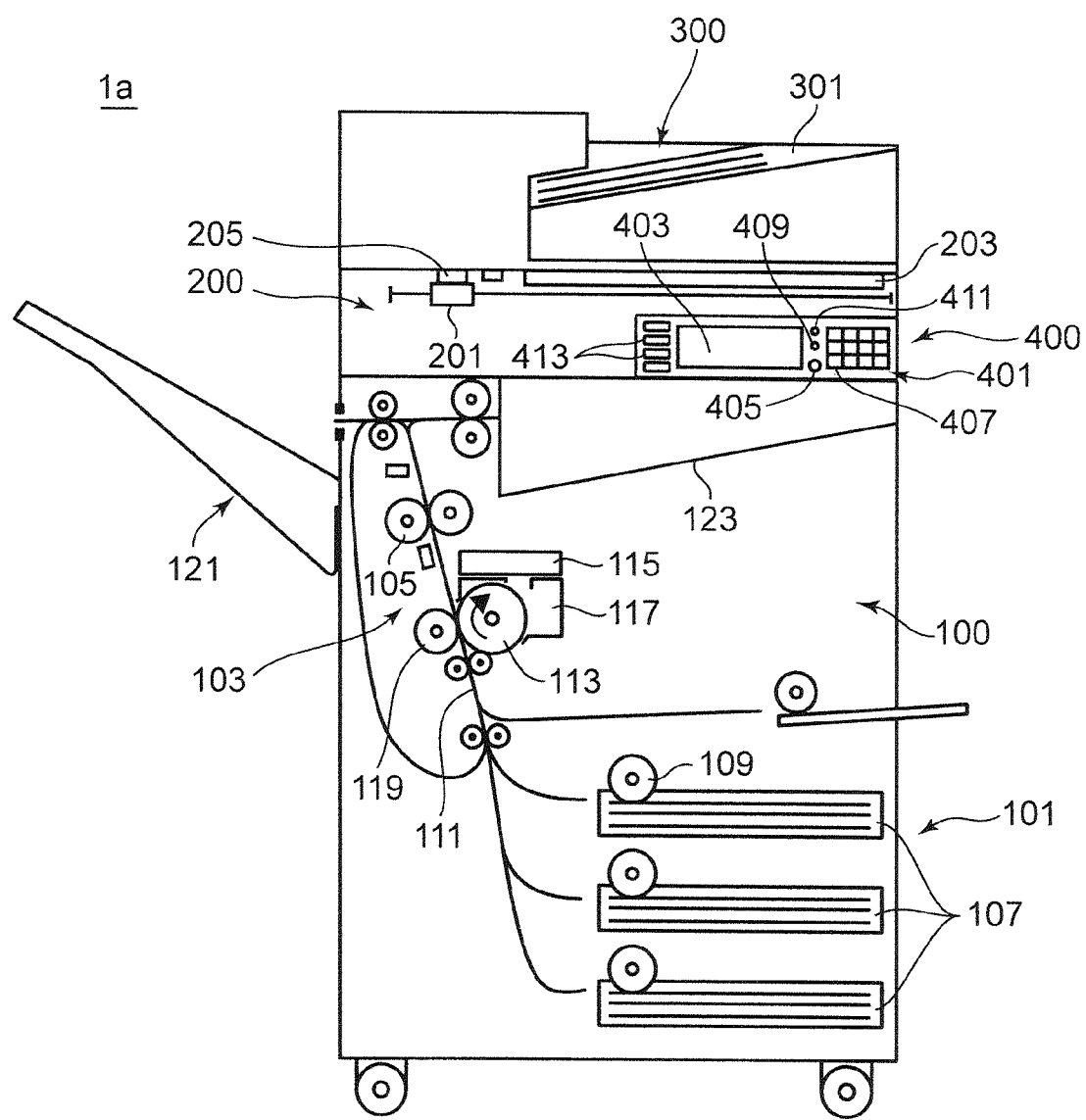
FIG. 1 is a diagram schematically showing the internal structure of an image forming apparatus according to a first embodiment.

Hereinafter, embodiments of the present disclosure are described in detail based on the drawings. FIG. 1 is a diagram schematically showing the internal structure of an image forming apparatus 1a according to a first embodiment of the present disclosure. The image forming apparatus 1a, which is a first apparatus, can be applied, for example, to a digital complex machine with functions of a copier, a printer, a scanner and a facsimile machine. The image forming apparatus 1a includes an apparatus main body 100, a document reading unit 200 arranged atop the apparatus main body 100, a document feeding unit 300 arranged atop the document reading unit 200 and an operation unit 400 arranged on an upper part of the front surface of the apparatus main body 100.

The document feeding unit 300 functions as an automatic document feeder and is capable of successively feeding a plurality of documents placed on a document placing portion 301 to the document reading unit 200.

The document reading unit 200 includes a carriage 201 carrying an exposure lamp and the like, a document platen 203 made of a transparent member such as a glass, an unillustrated CCD (Charge Coupled Device) sensor and a document reading slit 205. In the case of reading a document placed on the document platen 203, the document is read by the CCD sensor while the carriage 201 is moved in a longitudinal direction of the document platen 203. On the other hand, in the case of reading a document fed from the document reading unit 300, the carriage 201 is moved to a position facing the document reading slit 205 and the document fed from the document reading unit 300 is read by the CCD sensor through the document reading slit 205. The CCD sensor outputs the read document as image data.

The apparatus main body 100 includes a sheet storage unit 101, an image forming unit 103 and a fixing unit 105. The sheet storage unit 101 is arranged in a lowest part of the apparatus main body 100 and includes sheet trays capable of storing a stack of sheets. The uppermost sheet in the sheet stack stored in the sheet tray 107 is fed toward a sheet conveyance path 111 by driving a pickup roller 109. The sheet is conveyed to the image forming unit 103 via the sheet conveyance path 111.

The image forming unit 103 forms a toner image on a sheet conveyed thereto. The image forming unit 103 includes a photoconductive drum 113, an exposure unit 115, a developing unit 117 and a transfer unit 119. The exposure unit 115 generates a beam modulated in conformity with image data (image data output from the document reading unit 200, image data transmitted from a personal computer, facsimile-received image data or the like) and irradiates the generated beam to the uniformly charged circumferential surface of the photoconductive drum 113. This causes an electrostatic latent image corresponding to the image data to be formed on the circumferential surface of the photoconductive drum 113. By supplying toner from the developing unit 117 to the circumferential surface of the photoconductive drum 113 in this state, a toner image corresponding to the image data is formed on the circumferential surface. This toner image is transferred to a sheet conveyed from the sheet storage unit 101 described above by the transfer unit 119.

The sheet having the toner image transferred thereto is fed to the fixing unit 105. In the fixing unit 105, heat and pressure are applied to the toner image and the sheet, whereby the toner image is fixed to the sheet. The sheet is discharged to a stack tray 121 or a discharge tray 123.

The operation unit 400 includes an operation key unit 401 and a display unit 403. The display unit 403 has a touch panel function and displays a screen including soft keys. A user performs settings necessary to perform functions such as a copy function by operating the soft keys while viewing the screen.

The operation unit 401 includes operation keys composed of hard keys. Specifically, a start key 405, a numerical keypad 407, a stop key 409, a reset key 411, function changeover keys 413 to switch copy, printer, scanner and facsimile machine functions and the like are provided.

The start key 405 is a key for starting an operation such as a copying operation or facsimile transmission. The numerical keypad 407 includes keys used to input a number such as the number of sets to be copied or a facsimile number. The stop key 409 is a key for stopping a copying operation or the like halfway. The reset key 411 is a key for returning a set content to a default state.

The function changeover keys 413 include a copy key, a transmit key and the like and switch a copy function, a transmit function and the like from one to another. If the copy key is operated, an initial screen for copy is displayed on the display unit 403. If the transmit key is operated, an initial screen for facsimile transmission and mail transmission is displayed on the display unit 403.

Figure 2:
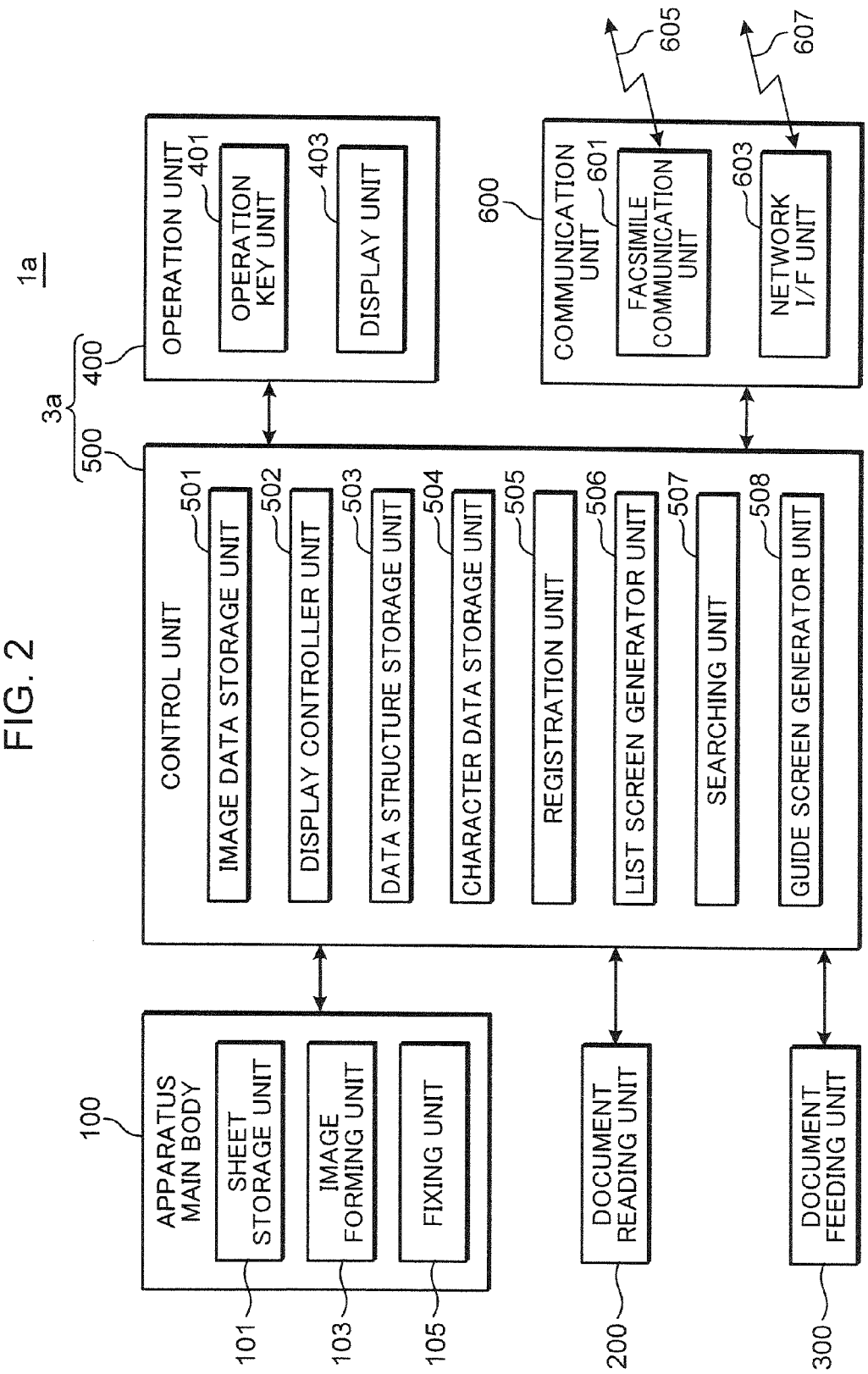
FIG. 2 is a block diagram showing the configuration of the image forming apparatus according to the first embodiment.

FIG. 2 is a block diagram showing the configuration of the image forming apparatus 1a shown in FIG. 1. The image forming apparatus 1a is so configured that the apparatus main body 100, the document reading unit 200, the document feeding unit 300, the operation unit 400, a control unit 500 and a communication unit 600 are connected to each other by a bus. An operation device 3a according to the first embodiment includes the control unit 500 and the operation unit 400 for receiving various inputs from the user. Since the apparatus main body 100, the document reading unit 200, the document feeding unit 300 and the operation unit 400 are already described, they are not described here.

The control unit 500 includes a CPU (Central Processing Unit), a ROM (Read Only Memory), a RAM (Random Access Memory), an image memory and the like. The CPU performs a control necessary to operate the image forming apparatus 1a on the above constituent elements of the image forming apparatus 1a such as the apparatus main body 100. The ROM stores software necessary to control the operation of the image forming apparatus 1a. The RAM is used to temporarily store data generated when the software is implemented and store application software and the like. The image memory temporarily stores image data (image data output from the document reading unit 200, image data transmitted from a personal computer, facsimile-received image data or the like).

The control unit 500 includes an image data storage unit 501, a display controller unit 502, a data structure storage unit 503, a character data storage unit 504, a registration unit 505, a list screen generator unit 506, a searching unit 507 and a guide screen generator unit 508 as functional blocks. These blocks are described in detail later.

The communication unit 600 includes a facsimile communication unit 601 and a network I/F unit 603. The facsimile communication unit 601 includes an NCU (Network Control Unit) for controlling a telephone line connection to a destination facsimile machine and a modulation/demodulation circuit for modulating and demodulating a signal for facsimile communication. The facsimile communication unit 601 is connected to a telephone line 605.

The network I/F unit 603 is connected to a LAN (Local Area Network) 607. The network I/F unit 603 is a communication interface circuit for carrying out a communication with terminal units such as personal computers connected to the LAN 607.

Figure 3:
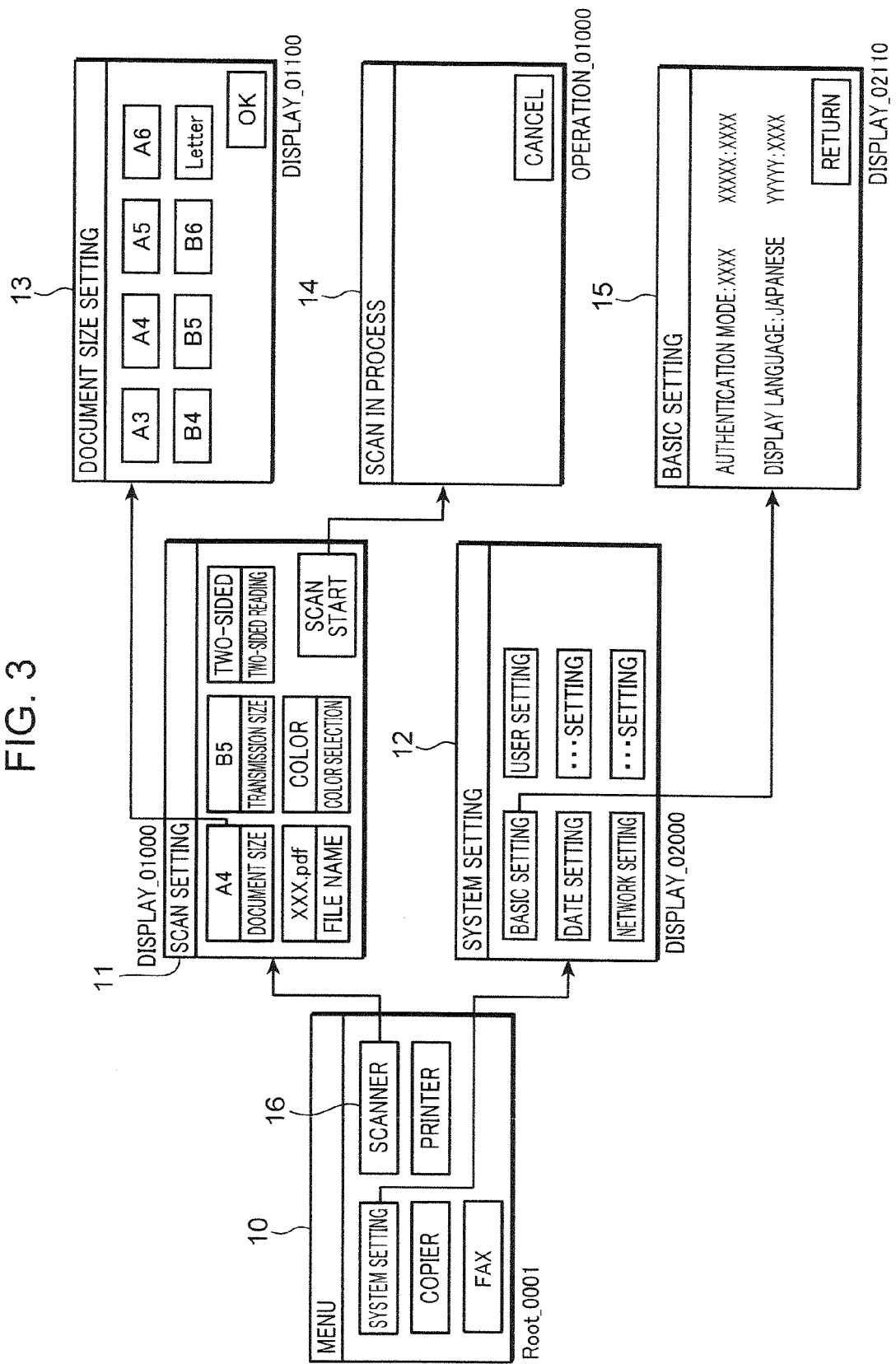
FIG. 3 is a diagram showing a specific example of a hierarchical structure of screens to be displayed on a display unit in the first embodiment.

FIG. 3 is a diagram showing a specific example of a hierarchical structure of screens to be displayed on the display unit 403. A menu screen 10 is an initial screen, which is a screen first displayed on the display unit 403 by the display controller unit 502 when the image forming apparatus 1a is turned on. A scan setting screen 11 and a system setting screen 12 are screens one rank lower than the menu screen 10. A document size setting screen 13 and a scan in-process screen 14 are screens one rank lower than the scan setting screen 11. A basic setting screen 15 is a screen one rank lower than the system setting screen 12.

These screens are a specific example of a plurality of screens used for the operation of the image forming apparatus 1a. The image data storage unit 501 stores a plurality of image data respectively representing these plurality of screens in advance. The display controller unit 502 selects one image data from a plurality of image data stored in the image data storage unit 501 in accordance with the operation of the operation unit 400 and causes the display unit 403 to display the screen represented by the selected image data.

Specific information (i.e. ID) which is information for specifying a screen is assigned to each of these screens in advance. In the first embodiment, the specific information of the menu screen 10 is "Root_0001", that of the scan setting screen 11 is "Display_01000", that of the system setting screen 12 is "Display_02000", that of the document size setting screen 13 is "Display_01100", that of the scan in-process screen 14 is "Operation_01000", and that of the basic setting screen 15 is "Display_02110".

Figure 4:
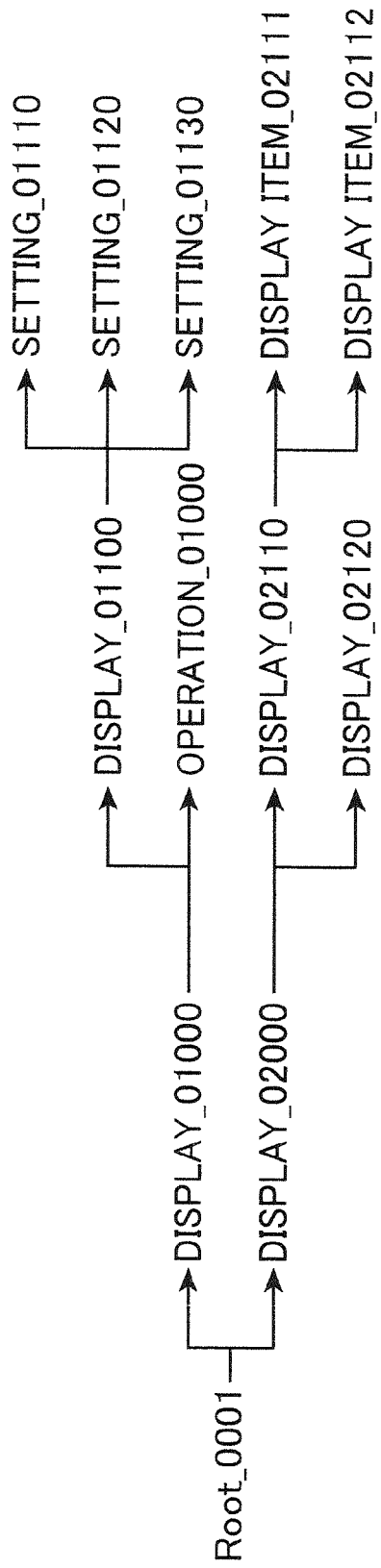
FIG. 4 is a diagram showing a tree-structured data structure corresponding to the hierarchical structure including a plurality of screens shown in FIG. 3.

FIG. 4 is a diagram showing a tree-structured data structure corresponding to the hierarchical structure including a plurality of screens shown in FIG. 3. The screens specified by "Display_02120", "Setting_01110", "Setting_01120", "Setting_01130", "Display Item_02111" and "Display Item_02112" are not shown in FIG. 3.

This data structure is stored in the data structure storage unit 503 in advance. The data structure is configured by the specific information for specifying each of the plurality of screens and has a tree structure corresponding to the hierarchical structure of the screens to be displayed on the display unit 403.

FIG. 5 is a diagram showing a specific example of a table containing character data representing the contents of the screens shown in FIG. 3. This table is stored in the character data storage unit 504 in advance. This table includes "Screen Specific Information", "Screen Image Data Path", "Previous Screen Trigger Coordinates" and "Character Data" as items. The items "Screen Specific Information", "Previous Screen Trigger Coordinates" and "Character Data" are stored in the character data storage unit 504 in correspondence with the "Screen Specific Information".

The item "Screen Specific Information" is a column in which the specific information shown in FIG. 4 is entered. The item "Screen Image Data Path" is a column in which paths in the image data storage unit 501 are entered. In the first embodiment, the image data of each screen is stored in a file format in the image data storage unit 501. In this case, a file name is a path to reach the image data of each screen.

The item "Previous Screen Trigger Coordinates" is a column in which coordinates of a key for displaying a screen being displayed out of keys included in the screen displayed one before the screen being displayed. For example, the scan setting screen 11 shown in FIG. 3 is displayed when a scanner key 16 of the menu screen 10 is operated. Thus, the previous screen trigger coordinates for the scan setting screen 11 are the coordinates of the scanner key 16 of the menu screen 10.

The item "Character Data" is a column in which character data representing the content of each screen specified by the specific information shown in FIG. 4 is entered. For example, the character data of the scan setting screen 11 shown in FIG. 3 is "Scan Setting". The character data is utilized in generating a list screen to be described later.

Figure 6:
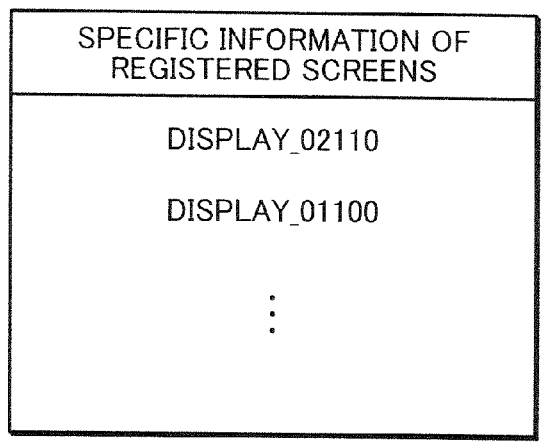
FIG. 6 is a diagram showing a specific example of specific information of screens registered in a registration unit.

FIG. 6 is a diagram showing a specific example of specific information of screens registered in the registration unit 505. The registration unit 505 registers the specific information of a screen, for which a registration command has been input, when the operation unit 400 is operated to input the registration command for the screen displayed on the display unit 403.

For example, when the user inputs a registration command by operating the operation unit 400 in a state where the basic setting screen 15 shown in FIG. 3 is displayed on the display unit 403, "Display_02110" which is the specific information of the basic setting screen 15 is registered in the registration unit 505. The input of the registration command specifically means, for example, the depression of a screen registration button (not shown) of the operation unit 400.

Figure 7:
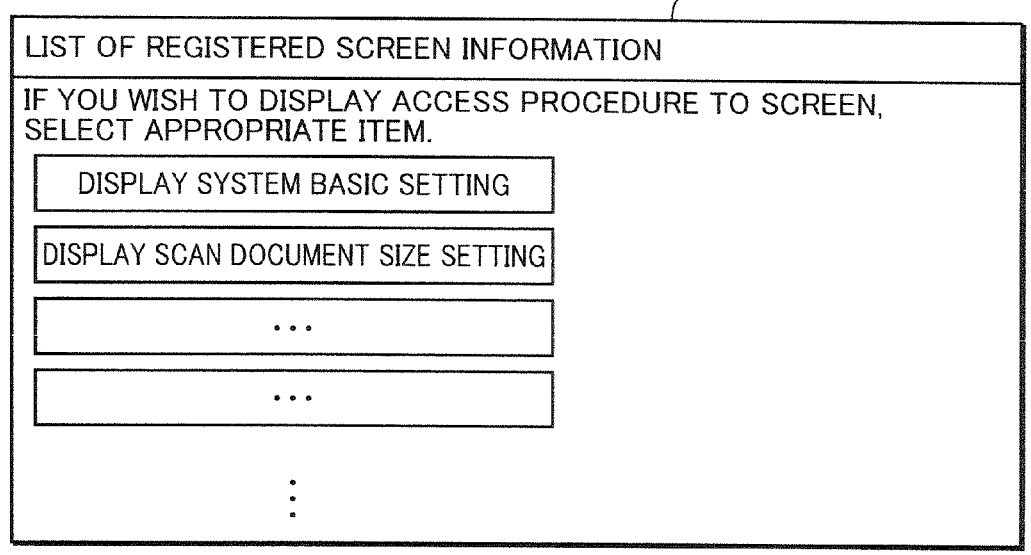
FIG. 7 is a diagram showing a specific example of a list screen relating to information of a screen for which a registration command has been input.

FIG. 7 is a diagram showing a specific example of a list screen 17 relating to the information of a screen for which a registration command has been input. When the user operates the operation unit 400 to input a command to display the list screen 17, the list screen generator unit 506 generates the list screen 17 for registration screens registered in the registration unit 505 and causes the display unit 403 to display it. This is a so-called help function, which is a function of displaying a procedure of accessing the screens registered by the user. The list screen can be called a help screen. The list screen 17 includes a title assigned to each registered screen such as "Display System Basic Setting" and "Display Scan Document Size Setting".

The list screen generator unit 506 generates the list screen 17 utilizing character data corresponding to specific information coinciding with the specific information registered in the registration unit 505 out of the character data stored in the character data storage unit 504. Specifically, when a command to display the list screen 17 is input, the list screen generator unit 506 searches specific information coinciding with the specific information of the registration screen registered in the registration unit 505 shown in FIG. 6 out of the specific information of the screens shown in FIG. 5. The list screen generator unit 506 generates the list screen 17 utilizing the character data corresponding to the coinciding specific information. For example, the character data corresponding to "Display_02110" of FIG. 6 is "System Basic Setting" as shown in FIG. 5. When the specific information includes an identifier of "Display", the list screen generator unit 506 automatically generates the title "Display System Basic Setting" by adding characters "Display".

By including an identifier for classifying "Operation", "Setting", "Display" having no execution function, and the like in the specific information, the title of each screen corresponding to the classification can be automatically generated. For example, if the identifier is "Operation", characters "Perform" are added. In this way, if the character data is "Scanning", a title "Perform Scanning" can be automatically generated. Further, if the identifier is "Setting", characters "Set" are added. In this way, if the character data is "Scanning of A4 Document", a title "Set Scanning of A4 Document" can be automatically generated. Note that if the character data is "Display System Basic Setting", a processing of automatically generating the title of the screen is unnecessary.

Figure 8:
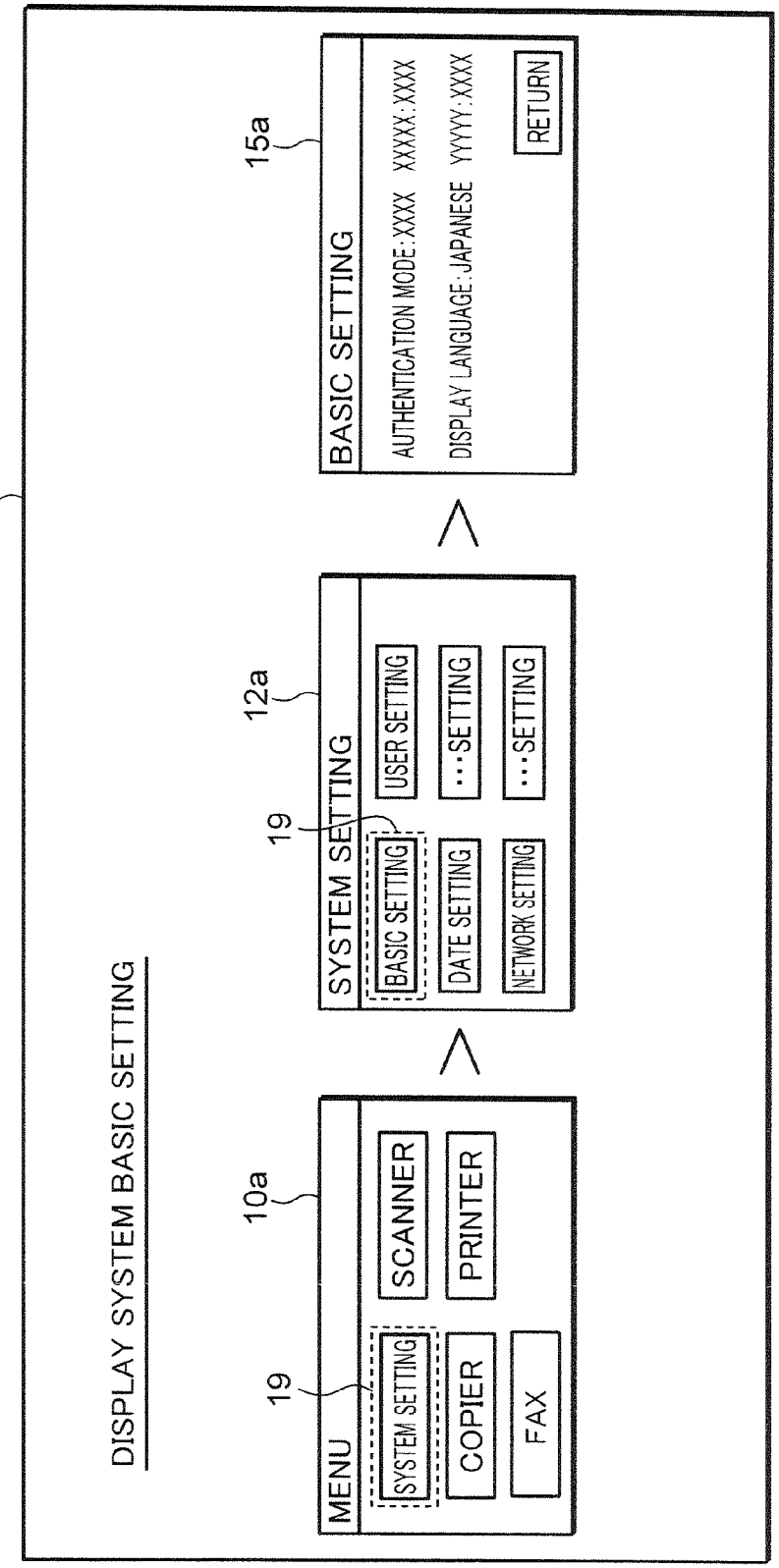
FIG. 8 is a diagram showing a specific example of a guide screen generated in a guide screen generator unit in the first embodiment.

FIG. 8 is a diagram showing a specific example of the guide screen 18. The guide screen 18 is displayed on the display unit 403 for a screen, for which the user has operated the operation unit 400 to input a command to display an access procedure out of the list screen 17 shown in FIG. 7. The input of the command to display the access procedure is described for an exemplary case where "Display System Basic Setting" shown in FIG. 7 is selected.

"Display System Basic Setting" is for causing the display unit 403 to display the basic setting screen 15 shown in FIG. 3. The title "Display System Basic Setting" is generated based on "Display_02110" shown in FIG. 6 as described above. The searching unit 507 searches a shortest route capable of accessing the basic setting screen 15 from the menu screen 10 (example of a higher ranked screen) utilizing "Display_02110" and the data structure shown in FIG. 4 for the screen specified by "Display_02110" (i.e. basic setting screen 15). In this example, "Root_0001"→"Display_02000"→"Display_02110" is a shortest route. The route searched by the searching unit 507 is preferably the shortest route, but not necessarily limited to the shortest route.

The guide screen generator unit 508 generates, for example, the guide screen 18 shown in FIG. 8 utilizing a screen specified by the specific information included in this shortest route and causes the display unit 403 to display it. The guide screen 18 shows a procedure capable of accessing the screen for which the command to display the access procedure has been input. The guide screen 18 includes a minified image 10a of the menu screen 10, a minified image 12a of the system setting screen 12 and a minified image 15a of the basic setting screen 15.

Dotted-line frames 19 enclosing a system setting key and a basic setting key are, for example, actually red frames and indicate that a switch is made to the system setting screen 12 if the system setting key is depressed and a switch is made to the basic setting screen 15 if the basic setting key is depressed. These dotted-line frames 19 are generated utilizing the previous screen trigger coordinates shown in FIG. 5 by the guide screen generator unit 508.

Note that if a processing of searching an item of the screen of "Display_02110" in the shortest route searching, an item settable on the screen of "Display_02110" can be included in the guide screen 18. Specifically, the item included in the basic setting screen 15 shown in FIG. 3 can be included in the guide screen 18.

Further, when the control unit 500 counts a display number for each guide screen and the capacity of the registration unit 505 is filled up, the specific information of the registration screen with a small display number of the guide screen may be deleted from the registration unit 505.

Main effects of the first embodiment are described. When the user operates the operation unit 400 to input a registration command for a screen displayed on the display unit 403 shown in FIG. 2, the specific information of that screen is registered in the registration unit 505 as shown in FIG. 6.

When wishing to view a list of the registered screens, the user operates the operation unit 400 to input a command to display a list screen relating to the information of the screen for which the registration command has been input. In this way, the list screen 17 shown in FIG. 7 is generated and displayed utilizing character data corresponding to the specific information coinciding with the specific information (FIG. 6) registered in the registration unit 505 out of the character data stored in the character data storage unit 504 (FIG. 5).

When there is a screen, for which an access procedure is wished to be displayed, on the list screen 17, the user operates the operation unit 400 to select the screen, for which a command to display an access procedure is to be input, out of the list screen 17. In this way, a route to access the screen for which the command to display the access procedure has been input from the menu screen 10 (example of the higher ranked screen) shown in FIG. 3 is searched utilizing the tree-structured data structure shown in FIG. 4. Then, utilizing the screen specified by the specific information included in the searched route, the guide screen 18 is generated which shows the procedure capable of accessing the screen for which the command to display the access procedure has been input as shown in FIG. 8.

As described above, according to the first embodiment, the user is not requested to access a targeted screen from the higher ranked screen when registering the screen displayed on the display unit 403 to enable the generation of the guide screen 18 showing the access procedure. Thus, according to the first embodiment, the access procedure from the higher ranked screen to the registered screen can be shown without imposing a burden on the user for the screen registration operation.

According to such a first embodiment, an operation procedure of accessing a screen a user routinely uses is registered as help information for the image forming apparatus 1a and can be shared by users of the image forming apparatus 1a.

Further, according to the first embodiment, the procedure of accessing the registered screen from the menu screen 10 is shown instead of directly displaying the registered screen. Thus, an operation of inputting a set value on the screen displayed on the display unit 403 by the user operating the operation unit 400 and an operation of switching from a higher ranked screen to a lower ranked screen by the user operating the operation unit 400 are repeated, which is particularly effective when the display controller unit 502 causes the display unit 403 to display a screen for which a registration command has been input.

Figure 9:
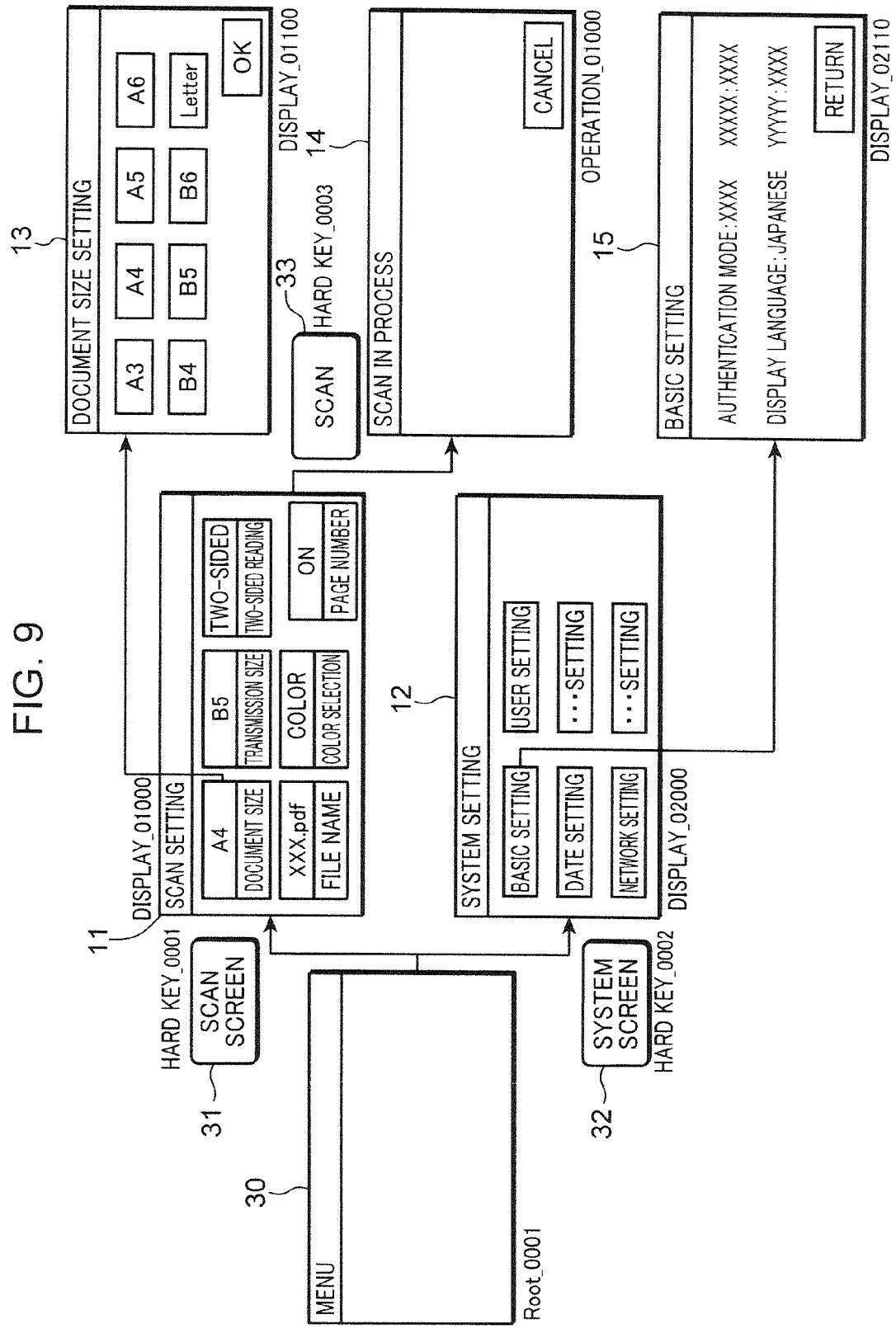
FIG. 9 is a diagram showing a specific example of a hierarchical structure of screens to be displayed on a display unit in a modification of the first embodiment.

A modification of the first embodiment is described. In some cases, the hard keys provided on the operation unit 400 need to be operated to access a registered screen from the menu screen. FIG. 9 is a diagram showing a specific example of a hierarchical structure of screens to be displayed on the display unit 403 in the modification and corresponds to FIG. 3. An image 31 showing a scan screen key, an image 32 showing a system screen key and an image 33 showing a scan key are images representing the scan screen key, the system screen key and the scan key (none of them is shown) out of the hard keys provided on the operation unit 400. Image data representing these images 31, 32 and 33 are stored in advance in the image data storage unit 501.

Specific information for specifying an image is assigned in advance to each of the images 31, 32 and 33. In this modification, the specific information of the image 31 representing the scan screen key is "Hard Key_0001", that of the image 32 representing the system screen key is "Hard Key_0002" and that of the image 33 representing the scan key is "Hard Key_0003".

A menu screen 30 shown in FIG. 9 includes no soft key. When the scan screen key, which is a hard key, is depressed with the menu screen 30 displayed, the display controller unit 502 causes the display unit 403 to display the scan setting screen 11. Further, when the system screen key, which is a hard key, is depressed with the menu screen 30 displayed, the display controller unit 502 causes the display unit 403 to display the system setting screen 12. Furthermore, when the scan key, which is a hard key, is depressed with the menu screen 30 displayed, the display controller unit 502 causes the display unit 403 to display the scan in-process screen 14.

The guide screen generator unit 508 of the modification performs a processing of inserting the image 31 of the scan screen key between a minified image of the menu screen 30 and a minified image of the scan setting screen 11 when a route searched by the searching unit 507 includes "Display_01000" indicating the scan setting screen 11. Further, the guide screen generator unit 508 performs a processing of inserting the image 32 of the system screen key between the minified image of the menu screen 30 and a minified image of the system setting screen 12 when the route searched by the searching unit 507 includes "Display_02000" indicating the system setting screen 12. Furthermore, the guide screen generator unit 508 performs a processing of inserting the image 33 of the scan key between a minified image of the scan in-process screen 14 and the minified image of the scan setting screen 11 when the route searched by the searching unit 507 includes "Operation_01000" indicating the scan in-process screen 14.

FIG. 10 is a diagram showing a specific example of a guide screen 34 generated by the guide screen generator unit 508 in the modification. An access procedure to the basic setting screen 15 is shown. The image 32 of the system screen key is inserted between a minified image 30a of the menu screen 30 and a minified image 12a of the system setting screen 12.

Next, a second embodiment of the present disclosure is described. An image forming apparatus according to the second embodiment has a function of generating a list screen utilizing specific information registered in a registration unit of another network-connected image forming apparatus in addition to specific information registered in a registration unit 505 of its own. Specifically, the image forming apparatus according to the second embodiment has a function of generating a list screen of information of screens for which a registration command has been input in the other network-connected image forming apparatus in addition to information of screens for which a registration command has been input in itself.

Figure 11:
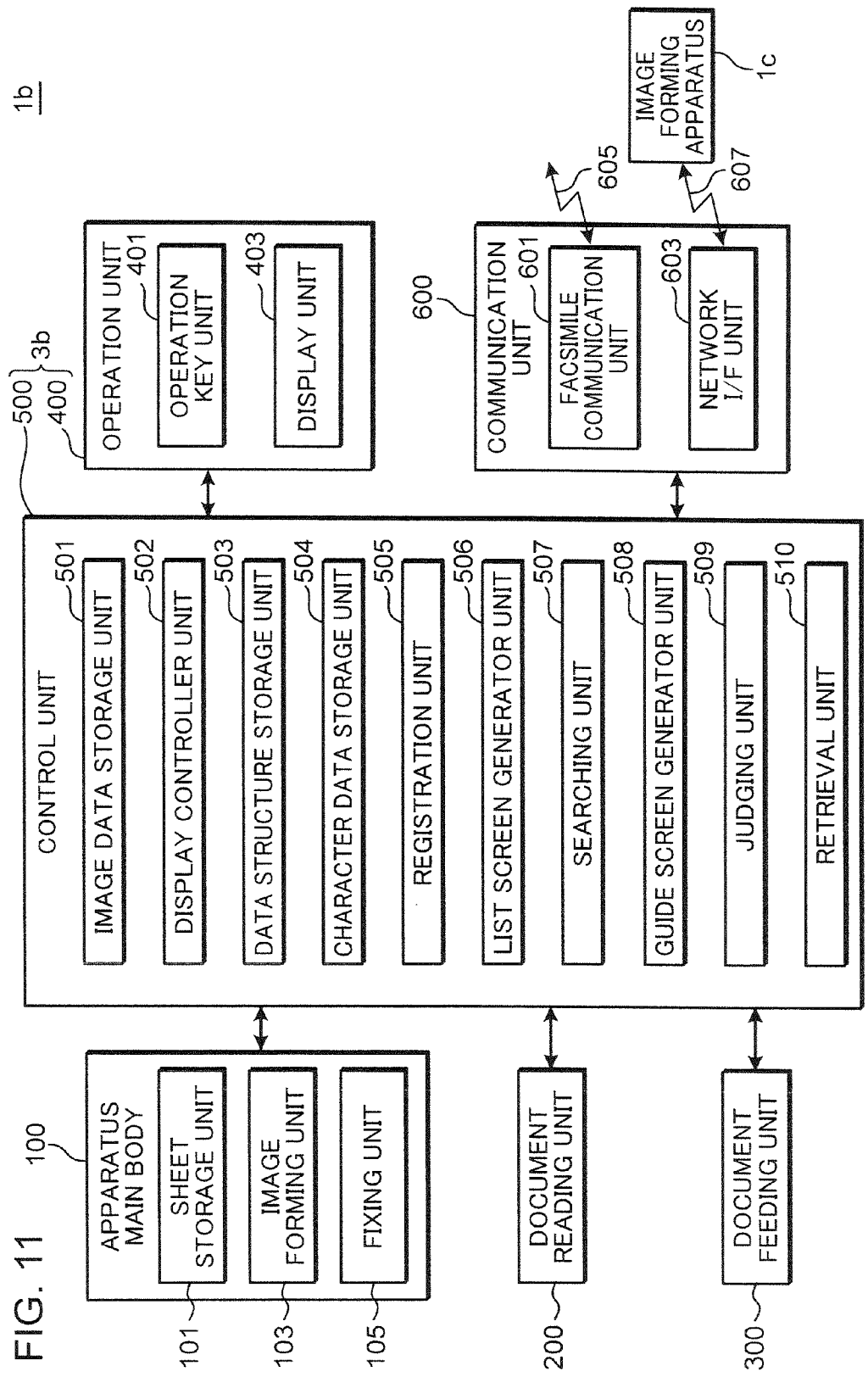
FIG. 11 is a block diagram showing the configuration of an image forming apparatus according to a second embodiment.

The internal structure of the image forming apparatus according to the second embodiment is not described since being the same as the internal structure of the image forming apparatus 1a according to the first embodiment shown in FIG. 1. FIG. 11 is a block diagram showing the electrical configuration of an image forming apparatus 1b according to the second embodiment. The same elements as those of the image forming apparatus 1a according to the first embodiment shown in FIG. 2 are denoted by the same reference signs and not described.

A control unit 500 of the image forming apparatus 1b includes a judging unit 509 and a retrieval unit 510 in addition to an image data storage unit 501, a display controller unit 502, a data structure storage unit 503, a character data storage unit 504, a registration unit 505, a list screen generator unit 506, a searching unit 507 and a guide screen generator unit 508 as functional blocks. The judging unit 509 and the retrieval unit 510 are described in detail later. An operation device 3b according to the second embodiment includes the control unit 500 and an operation unit 400 for receiving various inputs from a user.

The image forming apparatus 1b (first apparatus) is network-connected to an image forming apparatus 1c (second apparatus) having the same configuration as the image forming apparatus 1b. An image forming apparatus system is configured by the image forming apparatuses 1b and 1c. In the image forming apparatuses 1b and 1c, the same specific information is assigned to the same screens and substantially same screens. Thus, the data structure shown in FIG. 4 overlaps. However, functions of the image forming apparatus 1b and those of the image forming apparatus 1c do not perfectly coincide. For example, the image forming apparatus 1b has a function of scanning B4 documents, but does not have a function of scanning A3 documents. On the other hand, the image forming apparatus 1c has a function of scanning both B4 documents and A3 documents.

Figure 12:
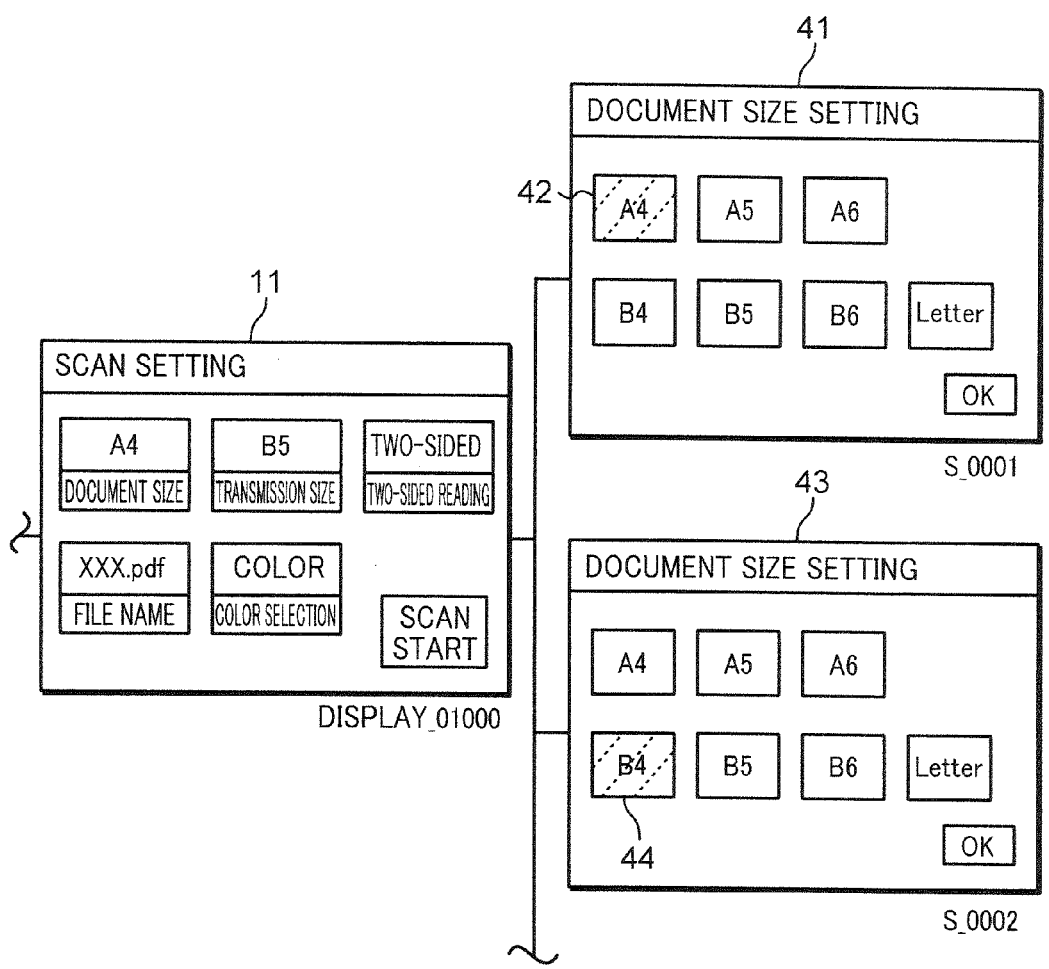
FIG. 12 is a diagram showing a part of a hierarchical structure of screens to be displayed on a display unit of the image forming apparatus according to the second embodiment.
Figure 13:
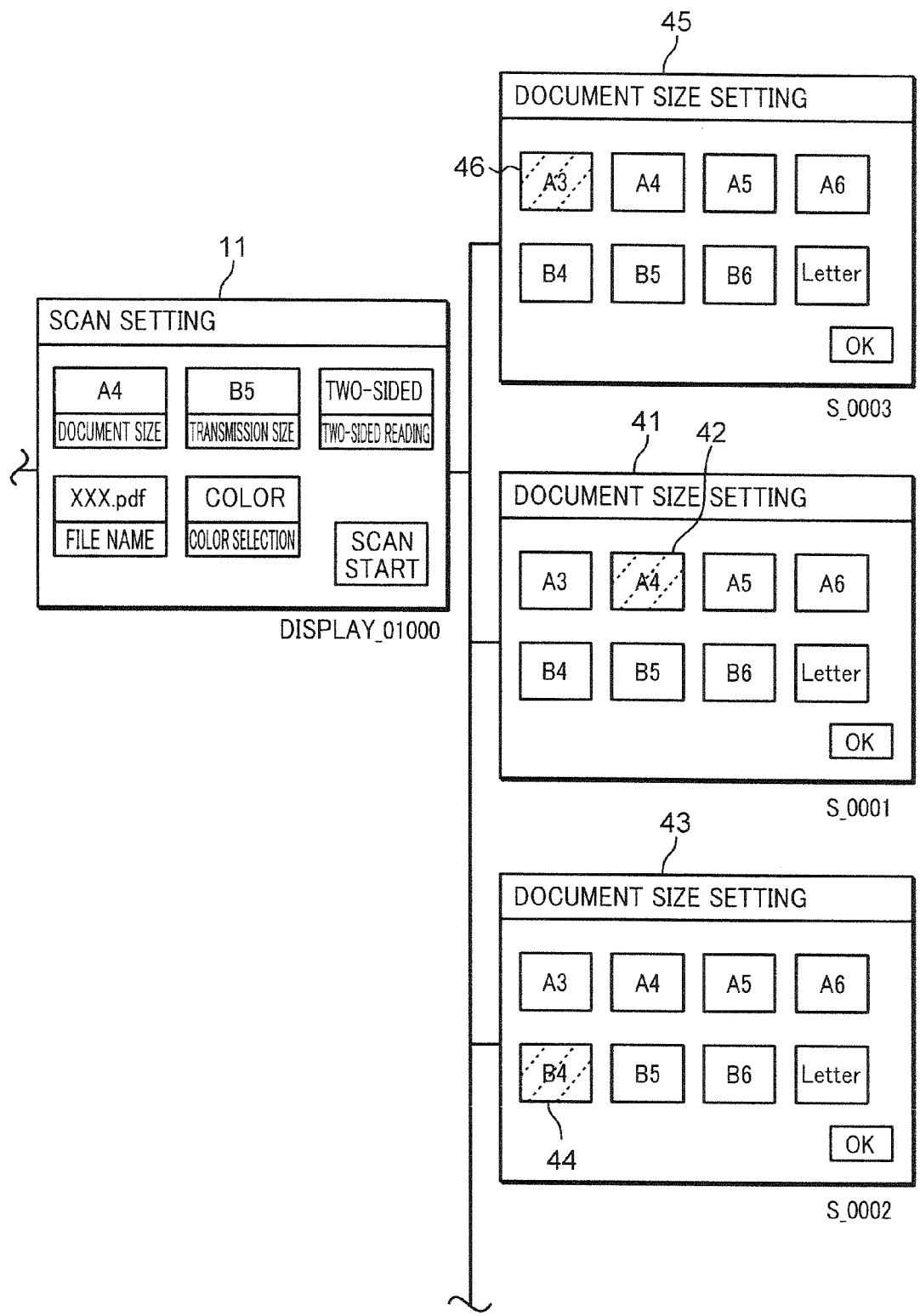
FIG. 13 is a diagram showing a part of a hierarchical structure of screens to be displayed on a display unit of another image forming apparatus.

FIG. 12 is diagram showing a part of a hierarchical structure of screens to be displayed on the display unit 403 of the image forming apparatus 1b. FIG. 13 is a diagram showing a part of a hierarchical structure of screens to be displayed on a display unit of the image forming apparatus 1c. On screens 41 for A4 document scan setting shown in FIGS. 12 and 13, an A4 key 42 is selected and highlighted. Specific information for specifying the screens for A4 document scan setting is "S_0001".

On screens 43 for B4 document scan setting shown in FIGS. 12 and 13, a B4 key 44 is selected and highlighted. Specific information for specifying the screens 43 for B4 document scan setting is "S_0002". On a screen 45 for A3 document scan setting shown in FIG. 13, an A3 key 46 is selected and highlighted. Specific information for specifying the screen 45 for A3 document scan setting is "S_0003". Specific information for specifying a scan setting screen 11 one rank higher than these screens is "Display_01000".

The scan setting screen 11 of FIG. 12 and that of FIG. 13 are the same screen. The document size setting screen 41 of FIG. 12 and the document size setting screen 41 of FIG. 13 differ in whether or not to include the A3 key, but are the same in setting the scan of A4 documents. Thus, they are substantially the same screens. The document size setting screen 43 of FIG. 12 and the document size setting screen 43 of FIG. 13 are also substantially the same screens for a similar reason. The same specific information is assigned to the same screens and substantially the same screens.

"Display_01000", "S_0001", "S_0002" and "S_0003" and character data corresponding to them are stored in advance in a character data storage unit of the image forming apparatus 1c. Contrary to this, "Display_01000", "S_0001" and "S_0002" and character data corresponding to them are stored in advance in the character data storage unit 504 of the image forming apparatus 1b, but "S_0003", the character data corresponding to this and the like are not stored therein.

Figure 14:
FIG. 14 is a diagram showing a data structure stored in a data structure storage unit of the image forming apparatus according to the second embodiment.
Figure 15:
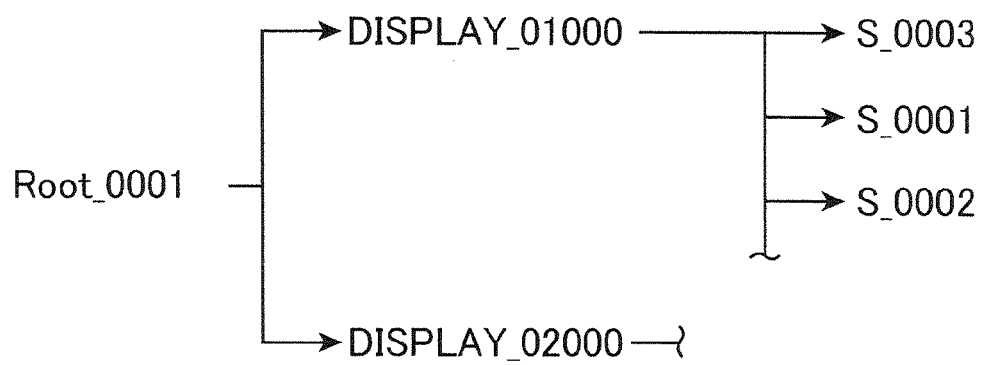
FIG. 15 is a diagram showing a data structure stored in a data structure storage unit of another image forming apparatus.

A data structure corresponding to the hierarchical structure of the screens of FIG. 12 is shown in FIG. 14, and a data structure corresponding to the hierarchical structure of the screens of FIG. 13 is shown in FIG. 15. The data structure shown in FIG. 14 is stored in the data structure storage unit 503 of the image forming apparatus 1b. The data structure shown in FIG. 15 is stored in a data structure storage unit of the image forming apparatus 1c.

In the image forming apparatus 1b, a screen displayed on the display unit 403 is registered in the same manner as in the first embodiment. Further, the generation and display of a list screen and a guide screen utilizing specific information registered in the registration unit 505 of the image forming apparatus 1b are the same as in the first embodiment.

Figure 16:
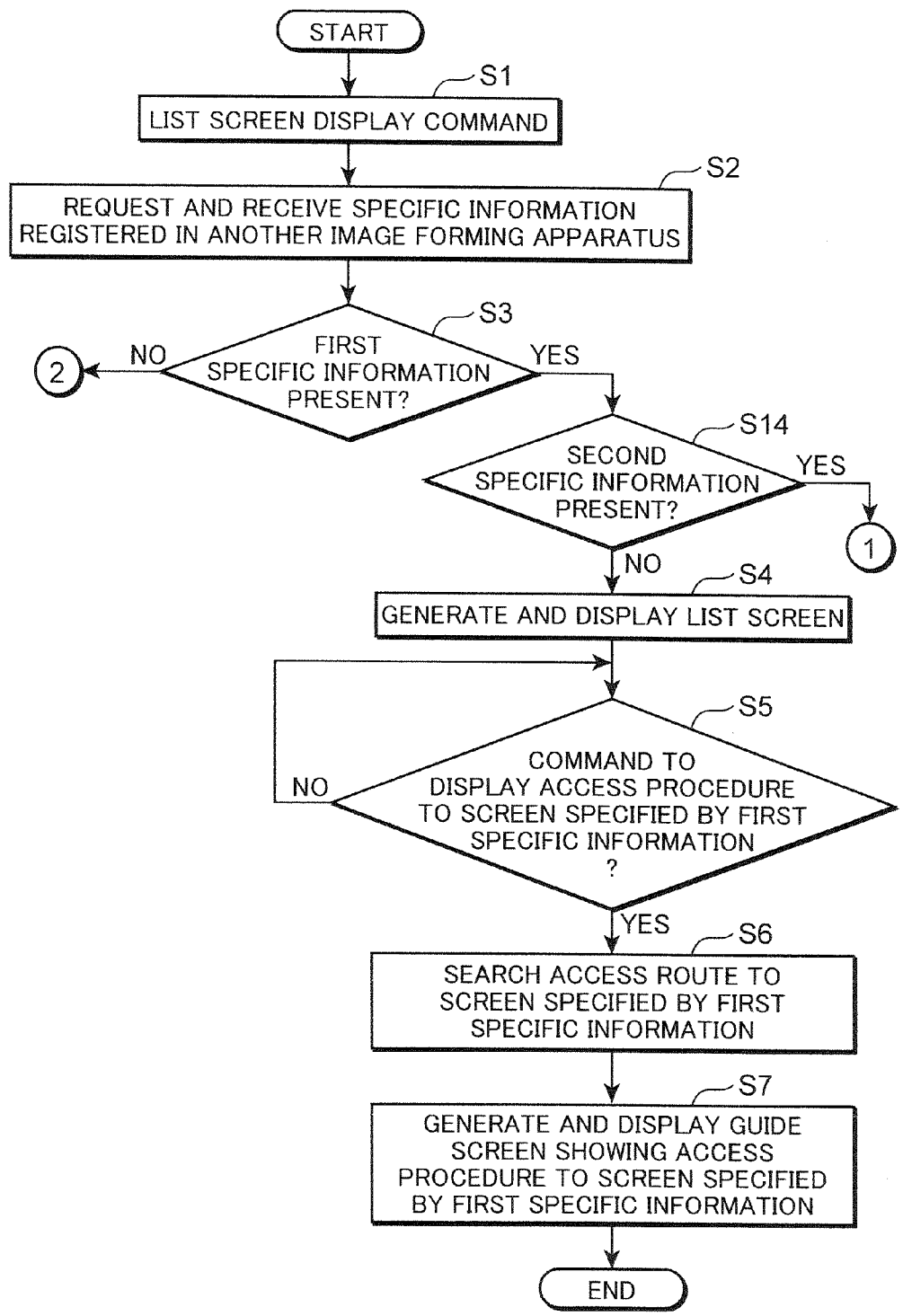
FIG. 16 is a flow chart showing a process in which the image forming apparatus according to the second embodiment generates and displays a list screen and a guide screen utilizing specific information registered in a registration unit of the other image forming apparatus.
Figure 17:
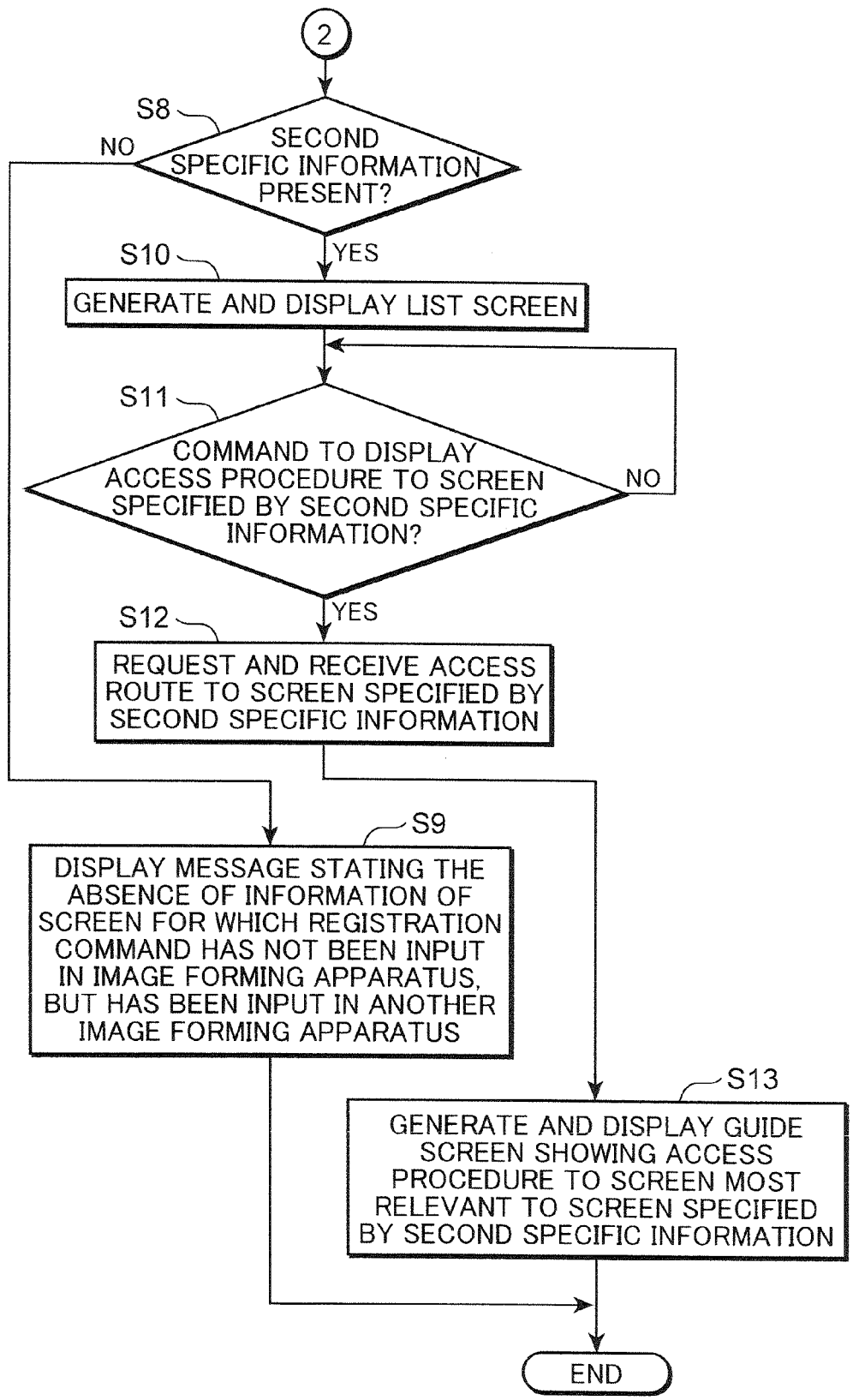
FIG. 17 is a flow chart showing a process after (2) of the flow chart shown in FIG. 16.
Figure 18:
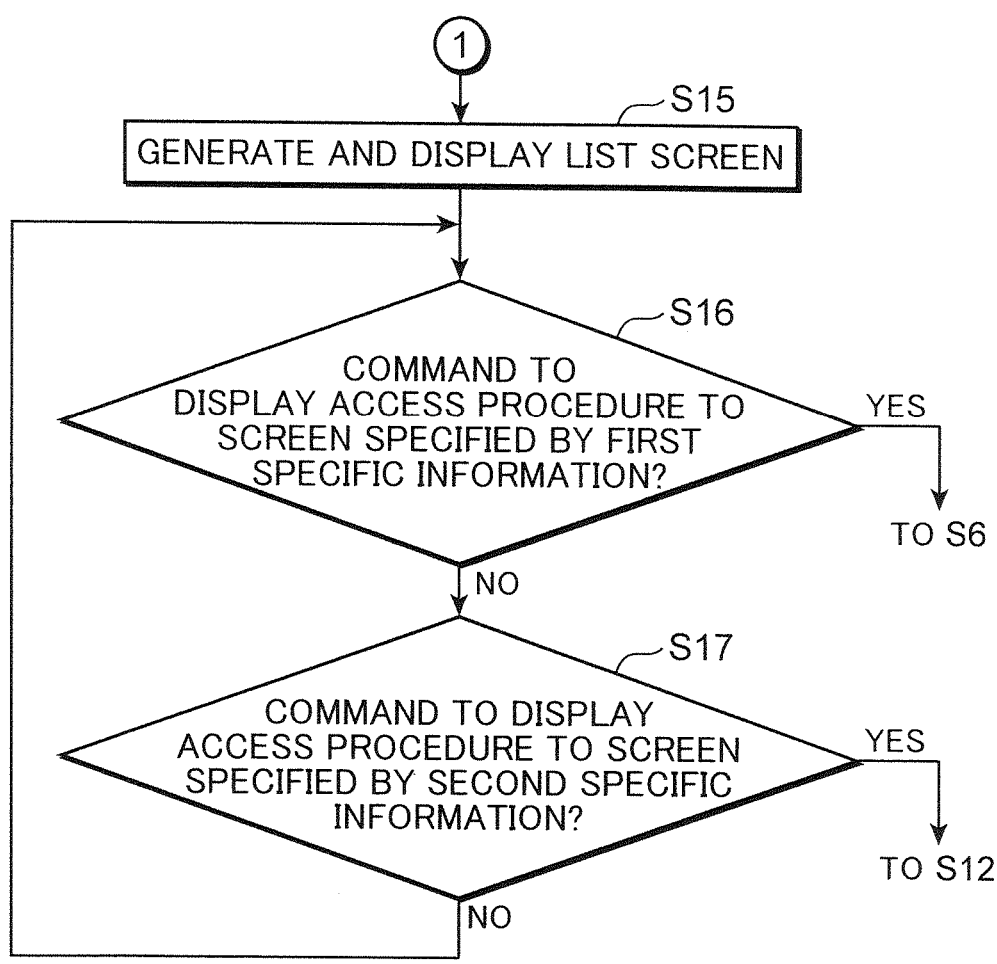
FIG. 18 is a flow chart showing a process after (1) of the flow chart shown in FIG. 16.

The image forming apparatus 1b has a function of generating and displaying a list screen and a guide screen utilizing specific information registered in the registration unit of the image forming apparatus 1c. FIGS. 16 to 18 are flow charts showing this.

With reference to FIG. 16, when the operation unit 400 of the image forming apparatus 1b is operated to input a command to display a list screen relating to information of a screen, for which a registration command has not been input in the image forming apparatus 1b, but has been input in the image forming apparatus 1c, to the operation unit 400 (Step S1), the control unit 500 causes a communication unit 600 to perform the following operation. The communication unit 600 requests the specific information registered in the registration unit of the image forming apparatus 1c to the image forming apparatus 1c via a network, and receives the specific information transmitted from the image forming apparatus 1c via the network (Step S2).

There are three types of specific information registered in the registration unit of the image forming apparatus 1c, i.e. (a) the same specific information as the specific information registered in the registration unit 505 of the image forming apparatus 1b, (b) first specific information (specific information which is not registered in the registration unit 505 of the image forming apparatus 1b, but stored in the character data storage unit 504 of the image forming apparatus 1b), and (c) second specific information (specific information which is not stored in the character data storage unit 504 of the image forming apparatus 1b and, hence, cannot be registered in the registration unit 505 of the image forming apparatus 1b).

The judging unit 509 of the image forming apparatus 1b judges whether or not the first specific information is present in the specific information transmitted from the image forming apparatus 1c (Step S3). As described above, the first specific information is specific information which is not registered in the registration unit 505 of the image forming apparatus 1b, but stored in the character data storage unit 504 of the image forming apparatus 1b. Since image data of a screen specified by the first specific information is stored in the image data storage unit 501, the image forming apparatus 1b can cause the display unit 403 to display the screen specified by the first specific information. "S_0001" shown in FIG. 12 is registered in the character data storage unit 504 of the image forming apparatus 1b. If "S_0001" is not registered in the registration unit 505 of the image forming apparatus 1b, "S_0001" transmitted from the image forming apparatus 1c is the first specific information.

If judging the presence of the first specific information (Yes in Step S3), the judging unit 509 judges whether or not the second specific information is present in the specific information transmitted from the image forming apparatus 1c (Step S14). A case where the second specific information is present (Yes in Step S14) is described later. If the judging unit 509 does not judge the presence of the second specific information (No in Step S14), the list screen generator unit 506 of the image forming apparatus 1b generates a list screen utilizing character data corresponding to the first specific information out of character data stored in the character data storage unit 504 and causes the display unit 403 to display it (Step S4). In this way, the display unit 403 of the image forming apparatus 1b can be caused to display a list screen relating to information of a screen for which a registration command has not been input in the image forming apparatus 1b, but has been input in the image forming apparatus 1c.

The control unit 500 of the image forming apparatus 1b judges whether or not a command to display an access procedure to the screen specified by the first specific information has been input by operating the operation unit 400 (Step S5). Unless the control unit 500 judges the input of the command to display the access procedure to the screen specified by the first specific information (No in Step S5), a processing of Step S5 is repeated.

If the control unit 500 judges the input of the command to display the access procedure to the screen specified by the first specific information (Yes in Step S5), the searching unit 507 of the image forming apparatus 1b searches a route to access that screen utilizing the data structure stored in the data structure storage unit 503 of the image forming apparatus 1b as in the first embodiment (Step S6).

The guide screen generator unit 508 of the image forming apparatus 1b generates a guide screen showing the access procedure utilizing the screen specified by the specific information included in the route and causes the display unit 403 to display it as in the first embodiment (Step S7).

The above is the process in the case of the first specific information, i.e. a process when the specific information of the screen, which has not been an object of the registration command in the image forming apparatus 1b, but has been an object of the registration command in the image forming apparatus 1c, is stored in the character data storage unit 504 of the image forming apparatus 1b.

Next, there is described a process when the specific information of the screen, for which a registration command has not been input in the image forming apparatus 1b, but has been input in the image forming apparatus 1c is not stored in the character data storage unit 504 of the image forming apparatus 1b (i.e. in the case of the second specific information). The second specific information is specific information included in the specific information transmitted from the image forming apparatus 1c and different from the specific information stored in the character data storage unit 504 of the image forming apparatus 1b. For example, since the image forming apparatus 1b does not have the function of scanning A3 documents, the specific information "S_0003" shown in FIG. 13 is not stored in the character data storage unit 504 of the image forming apparatus 1b. If "S_0003" is transmitted from the image forming apparatus 1c, "S_0003" is the second specific information. Since image data of the screen specified by the second specific information "S_0003" is not stored in the image data storage unit 501 of the image forming apparatus 1b, the image forming apparatus 1b cannot cause the display unit 403 to display the screen specified by the second specific information. The process in the case of the second specific information is described below, taking "S_0003" as an example.

If not judging the presence of the first specific information (No in Step S3), the judging unit 509 of the image forming apparatus 1b judges whether or not the second specific information is present in the specific information transmitted from the image forming apparatus 1c as shown in FIG. 17 (Step S8).

Unless the judging unit 509 judges the presence of the second specific information (No in Step S8), neither the first specific information nor the second specific information is present. This is a case where the specific information registered in the image forming apparatus 1c is the specific information (a) described above, i.e. the same as the specific information registered in the registration unit 505 of the image forming apparatus 1b. Thus, the process is finished after the display controller unit 502 controls to cause the display unit 403 to display a message to the effect that the specific information from the image forming apparatus 1c is the same as the specific information already registered in the registration unit 505 of the image forming apparatus 1b (Step S9).

If the judging unit 509 judges the presence of the second specific information (Yes in Step S8), the control unit 500 of the image forming apparatus 1b causes the communication unit 600 to perform the following operation. The communication unit 600 requests character data corresponding to the second specific information to the image forming apparatus 1c via the network, and receives the character data transmitted from the image forming apparatus 1c. The character data here is a title "Set Scanning of A3 Documents" generated by a list screen generator unit of the image forming apparatus 1c. Note that character data "Scanning of A3 Documents" may be received from the image forming apparatus 1c and a title "Set Scanning of A3 Documents" may be generated by the list screen generator unit 506 of the image forming apparatus 1b.

The list screen generator unit 506 of the image forming apparatus 1b generates a list screen utilizing the character data transmitted from the image forming apparatus 1c and causes the display unit 403 to display it (Step S10). For example, a list screen including characters "Set Scanning of A3 Documents" is displayed. The list screen generator unit 506 of the image forming apparatus 1b may add a processing of adding a display to the effect that A3 documents cannot be scanned in the image forming apparatus 1b to the list screen.

The control unit 500 of the image forming apparatus 1b judges whether or not a command to display an access procedure to the screen specified by the second specific information has been input by operating the operation unit 400 (Step S11). Unless the control unit 500 judges the input of the command to display the access procedure to the screen specified by the second specific information (No in Step S11), a processing of Step S11 is repeated.

If the control unit 500 judges the input of the command to display the access procedure to the screen specified by the second specific information (Yes in Step S11), the control unit 500 causes the communication unit 600 to perform the following operation. The communication unit 600 requests a search of a route to the screen specified by the second specific information ("S_0003" in this example) to the image forming apparatus 1c, and receives the route transmitted from the image forming apparatus 1c (Step S12).

The operation of the image forming apparatus 1c in this case is described. A searching unit of the image forming apparatus 1c searches a shortest route utilizing "S_0003" and the data structure stored in a data structure storage unit of the image forming apparatus 1c shown in FIG. 15. The shortest route here is "Root_0001"→"Display_01000"→"S_0003". The image forming apparatus 1c transmits this shortest route to the communication unit 600 of the image forming apparatus 1b.

The retrieval unit 510 of the image forming apparatus 1b traces back the route ("Root_0001"→"Display_01000"→"S_0003") transmitted from the image forming apparatus 1c from the lower rank to the higher rank and retrieves the specific information first coinciding with any specific information stored in the character data storage unit 504 of the image forming apparatus 1b out of the specific information constituting this route. With reference to FIGS. 14 and 15, "Display_01000" is the first coinciding specific information in this example.

The guide screen generator unit 508 of the image forming apparatus 1b generates a guide screen showing a procedure capable of accessing the screen specified by the first coinciding specific information and causes the display unit 403 to display it (Step S13). In other words, the screen most relevant to the screen specified by the second specific information is displayed. FIG. 19 is a diagram showing a specific example of a guide screen 51. The guide screen 51 includes a minified image 10a of the menu screen 10 and a minified image 11a of the scan setting screen 11. An access procedure to a screen for setting the size of documents to be scanned can be shown by the guide screen 51 although the scanning of A3 documents cannot be set.

On the other hand, if the judging unit 509 of the image forming apparatus 1b judges the presence of the first specific information (Yes in Step S3) and judges the presence of the second specific information (Yes in Step S14), the list screens described in Step S4 and Step S10 are generated and displayed (Step S15 of FIG. 18). Specifically, the list screen generator unit 506 of the image forming apparatus 1b generates the list screen utilizing the character data corresponding to the first specific information out of the character data stored in the character data storage unit 504 and causes the display unit 403 to display it. Further, the list screen generator unit 506 of the image forming apparatus 1b generates the list screen utilizing the character data transmitted from the image forming apparatus 1c and causes the display unit 403 to display it.

The control unit 500 of the image forming apparatus 1b judges whether or not a command to display an access procedure to the screen specified by the first specific information has been input by operating the operation unit 400 (Step S16). If the control unit 500 judges the input of the command to display the access procedure to the screen specified by the first specific information (Yes in Step S16), a transition is made to Step S6.

Unless the control unit 500 of the image forming apparatus 1b judges the input of the command to display the access procedure to the screen specified by the first specific information (No in Step S16), it judges whether or not a command to display an access procedure to the screen specified by the second specific information has been input by operating the operation unit 400 (Step S17). Unless the control unit 500 judges the input of the command to display the access procedure to the screen specified by the second specific information (No in Step S17), a return is made to Step S16.

If the control unit 500 judges the input of the command to display the access procedure to the screen specified by the second specific information (Yes in Step S17), a transition is made to Step S12.

Main effects of the second embodiment are described. The first specific information described in Steps S3, S4, S5, S6 and S7 is the specific information, which is not registered in the registration unit 505 of the image forming apparatus 1b, but is stored in the character data storage unit 504 of the image forming apparatus 1b, out of the specific information registered in the registration unit of the image forming apparatus 1c. Since the image data of the screen specified by the first specific information is stored in the image data storage unit 501, the image forming apparatus 1b can cause the display unit 403 to display the screen specified by the first specific information. According to the second embodiment, if the specific information received from the image forming apparatus 1c is the first specific information, the information on the screen specified by the first specific information (i.e. screen for which a registration command has not been input in the image forming apparatus 1b, but has been input in the image forming apparatus 1c) can also be included in the list screen. Thus, the information of screens for which a registration command has been input in each image forming apparatus can be shared between the network-connected image forming apparatuses.

The second specific information described in Steps S3, S8, S10, S11, S12 and S13 is the specific information, which is neither registered in the registration unit 505 of the image forming apparatus 1b nor stored in the character data storage unit 504 of the image forming apparatus 1b, out of the specific information registered in the registration unit of the image forming apparatus 1c. Since the image data of the screen specified by the second specific information is not stored in the image data storage unit 501 of the image forming apparatus 1b, the image forming apparatus 1b cannot cause the display unit 403 to display the screen specified by the second specific information. According to the second embodiment, if the specific information received from the image forming apparatus 1c is the second specific information, the display unit 403 is caused to display the screen most relevant to the screen specified by the second specific information. Thus, even if the specific information received from the image forming apparatus 1c is the second specific information, the image forming apparatus 1b can effectively utilize it.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An operation device used for the operation of a first apparatus, comprising:
  a display unit;
  an operation unit for receiving various inputs from a user;
  an image data storage unit storing a plurality of image data respectively representing a plurality of screens used for the operation of the first apparatus in advance;
  a display controller unit for selecting one image data out of the plurality of image data stored in the image data storage unit in accordance with the operation of the operation unit and causing the display unit to display the screen represented by the selected image data;
  a data structure storage unit storing a tree-structured data structure corresponding to a hierarchical structure of screens to be displayed on the display unit, the data structure being constituted by specific information for specifying each of the plurality of screens, in advance;
  a character data storage unit storing character data representing the content of each of the plurality of screens in correspondence with the specific information of each of the plurality of screens in advance,
  a registration unit for registering the specific information of a first screen when the operation unit is operated to input the registration command in a state where the first screen is displayed on the display unit in the plurality of screens;
  a second screen generator unit for generating a second screen utilizing the character data corresponding to the specific information coinciding with the specific information registered in the registration unit out of the character data stored in the character data storage unit and causing the display unit to display the generated second screen when a command to display the second screen including the character data representing the content of the first screen input is input by operating the operation unit,
  a searching unit for searching a route for accessing from a higher ranked screen for the first screen, utilizing the data structure stored in the data structure storage unit when the character data included in the second screen is selected by operating the operation unit; and
  a guide screen generator unit for generating a guide screen including minified images of the respective screens displayed on the display units until an access is made from the higher ranked screen to the first screen, utilizing screens specified by the specific information included in the route searched by the searching unit and causing the display unit to display the generated guide screen.

2. An operation device according to claim 1, wherein:
the display controller unit causes the display unit to display the first screen by an operation that an operation of inputting a set value on the screen displayed on the display unit by operating the operation unit and an operation of switching from a higher ranked screen to a lower ranked screen by operating the operation unit are repeated.

3. An operation device according to claim 1, wherein:
the operation unit includes a hard key;
the image data storage unit stores an image representing the hard key in advance;
the data structure stored in advance in the data structure storage unit includes the specific information for specifying the image representing the hard key; and
the guide screen generator unit includes the image representing the hard key in the guide screen when the specific information of the image representing the hard key is included in the route searched by the searching unit.

4. An operation device according to claim 1, wherein:
the first apparatus is connectable via a network to a second apparatus including the display unit, the operation unit, the image data storage unit, the display controller unit, the data structure storage unit, the character data storage unit, the registration unit, the second screen generator unit, the searching unit and the guide screen generator unit;
the data structure overlaps in the first and second apparatuses;
the first apparatus includes:
  a communication unit for requesting the specific information registered in the registration unit of the second apparatus to the second apparatus and receiving the specific information transmitted from the second apparatus when a command to display the second screen is input by operating the operation unit of the first apparatus, and
  a judging unit for judging the presence or absence of first specific information, which is not registered in the registration unit of the first apparatus, but is stored in the character data storage unit of the first apparatus, out of the specific information transmitted from the second apparatus; and
the second screen generator unit of the first apparatus generates the list screen utilizing the character data corresponding to the first specific information and causes the display unit to display the generated second screen if the judging unit judges the presence of the first specific information.

5. An operation device according to claim 4, wherein:
the judging unit judges the presence or absence of second specific information, which is neither registered in the registration unit of the first apparatus nor stored in the character data storage unit of the first apparatus, out of the specific information transmitted from the second apparatus;
the communication unit requests the character data corresponding to the second specific information to the second apparatus and receives the character data transmitted from the second apparatus if the judging unit judges the presence of the second specific information;
the second screen generator unit of the first apparatus generates the second screen utilizing the character data transmitted from the second apparatus and causes the display unit to display the generated second screen;
the communication unit requests the search of the route of the screen specified by the second specific information to the second apparatus and receives the route transmitted from the second apparatus if the specific information is the second specific information for the screen for which the command to display the access procedure has been input out of the second screen by operating the operation unit of the first apparatus;
the first apparatus includes a retrieval unit for tracing back the route transmitted from the second apparatus from a lower rank to a higher rank and retrieving the specific information first coinciding with any specific information stored in the character data storage unit of the first apparatus out of the specific information constituting the route; and
the guide screen generator unit of the first apparatus generates the guide screen showing a procedure capable of accessing the screen specified by the first coinciding specific information and causes the display unit to display the generated guide screen.

6. An image forming apparatus, comprising:
an operation device according to claim 1;
wherein the image forming apparatus functions as the first apparatus.

7. An image forming apparatus system, comprising:
an image forming apparatus including an operation device according to claim 4 and functioning as the first apparatus; and
another image forming apparatus including an operation device according to claim 4 and functioning as the second apparatus.

* * * * *